(12) United States Patent
Al-Jafar

(10) Patent No.: US 9,051,928 B2
(45) Date of Patent: Jun. 9, 2015

(54) SAFETY DEVICE FOR PREVENTING DELIVERY OF FUEL TO A MOTOR VEHICLE WITH A RUNNING ENGINE

(76) Inventor: Ahmad I. S. I. Al-Jafar, Safat (KW)

( * ) Notice: Subject to any disclaimer, the term of this patent is extended or adjusted under 35 U.S.C. 154(b) by 1066 days.

(21) Appl. No.: 13/103,324

(22) Filed: May 9, 2011

(65) Prior Publication Data

US 2012/0288378 A1 Nov. 15, 2012

(51) Int. Cl.
*F04B 49/02* (2006.01)
*F04B 49/10* (2006.01)
*B60K 15/035* (2006.01)
*F02M 25/08* (2006.01)
*B60K 15/03* (2006.01)
*F02M 35/02* (2006.01)

(52) U.S. Cl.
CPC ........... *F04B 49/10* (2013.01); *B60K 15/03519* (2013.01); *F02M 25/08* (2013.01); *B60K 2015/03381* (2013.01); *B60K 2015/03375* (2013.01); *B60Y 2306/01* (2013.01); *F02M 25/0827* (2013.01); *F02M 35/0201* (2013.01)

(58) Field of Classification Search
CPC .................................. F04B 49/02; F04B 49/10
USPC ............... 417/14; 340/941, 943, 933; 701/99, 701/101; 141/94, 98, 192
See application file for complete search history.

(56) References Cited

U.S. PATENT DOCUMENTS

| 5,329,164 | A | | 7/1994 | Saito |
|---|---|---|---|---|
| 5,628,351 | A | * | 5/1997 | Ramsey et al. ................. 141/98 |
| 5,705,999 | A | * | 1/1998 | West et al. .................... 340/941 |
| 6,002,332 | A | * | 12/1999 | King .......................... 340/545.1 |
| 6,222,458 | B1 | | 4/2001 | Harris |
| 6,575,206 | B2 | | 6/2003 | Struthers et al. |
| 7,096,895 | B2 | | 8/2006 | Barker |
| 7,195,093 | B1 | | 3/2007 | Ahmadi |
| 2010/0121551 | A1 | * | 5/2010 | Boss et al. ....................... 701/99 |
| 2011/0169664 | A1 | * | 7/2011 | Berger et al. .................. 340/943 |
| 2012/0095920 | A1 | * | 4/2012 | McQuade et al. .............. 705/50 |
| 2012/0162422 | A1 | * | 6/2012 | Lester ............................ 348/148 |
| 2013/0201324 | A1 | * | 8/2013 | Cardoso et al. ............... 348/135 |

* cited by examiner

*Primary Examiner* — Christopher Bobish
(74) *Attorney, Agent, or Firm* — Richard C Litman

(57) ABSTRACT

A safety device for a fuel outlet to prevent delivery of highly combustible fuel to a motor vehicle with a running engine. The safety device comprises a fuel pump for pumping the fuel from an underground tank and into a motor vehicle. The device includes a sound sensor disposed below an area to be occupied by a motor vehicle adjacent to the fuel pump and is adapted to sense the sound of a running engine in an adjacent vehicle and a temperature sensor adapted to detect the engine temperature of an adjacent vehicle. Further, the device or system includes an RF radiation detector adjacent said pump for detecting a running engine, a data analyzer and a control unit for disabling the fuel pump when a running engine is detected in the vicinity of the fuel pump.

1 Claim, 1 Drawing Sheet

SAFETY DEVICE FOR PREVENTING DELIVERY OF FUEL TO A MOTOR VEHICLE WITH A RUNNING ENGINE

FIELD OF THE INVENTION

This invention relates to a safety device for a fuel outlet to prevent delivery of fuel to a motor vehicle with a running engine and more particularly to a safety device for sensing the heat from a running engine, the sound of a running engine and the radio frequency of a running engine.

BACKGROUND OF THE INVENTION

Safety devices for fuel outlets to prevent delivery of flammable fuel to a motor vehicle under dangerous conditions are known and have been in use for a number of years. For example, a U.S. Pat. No. 5,329,164 of Saito discloses a fuel supply system for a motor vehicle wherein a solenoid valve is interposed in an air breather pipe by which fuel vaporized in a fuel tank is introduced into a canister, and the solenoid valve is opened by an ON signal of a fuel flap switch which turns on when a fuel flap is opened so as to bring the air breather pipe into communication from the fuel tank to the canister, thereby permitting the fuel tank to be fueled. A safety circuit for a fuel supply system of a motor vehicle comprises a solenoid valve driving circuit which extends from a power source to an earth through the fuel flap switch. The solenoid valve is provided with a first relay of a normally-closed type to turn OFF in an ON state of a boost switch which turns on when a stop of the engine is detected. In an ON state of an ignition key switch an ignition coil driving circuit extends from the power source to the earth through the ignition key switch. An ignition coil is provided with a second relay of normally-closed type to turn OFF during energization of the solenoid valve driving circuit, whereby the fuel tank can be fueled only when the engine is stopped.

Another approach for avoiding delivery of fuel under dangerous conditions is disclosed in a U.S. Pat. No. 6,222,458 of Harris entitled Automatic Cell Phone Detection. At A Combustible Delivery Station, As disclosed, protection against use of a two way radio, e.g. a cellular phone is prevented at a combustible delivery station. One mode is active, and detects operating cell phones at the gas station. The phones can be detected using Bluetooth The pump can be turned off when the alarm is detected. Another mode is passive. This mode can be via shielding, alone or with RE jamming.

A still further approach for avoiding delivery of fuel to a motor vehicle under unsafe conditions is disclosed in a U.S. Patent of Struthers et al for a Fuel Dispenser Having An Internal Catastrophic Protection System, U.S. Pat. No. 6,575,206. As disclosed, a fuel dispenser for service stations comprises an integrated catastrophic protection system. The dispenser comprises a leak detector, an impact (or displacement) sensor, and a heat sensor for detecting dangerous conditions in or around the dispenser. The sensors may be connected to a processor within the dispenser or may send signals to a remote processor. Upon detection of any of the dangerous conditions, a system controller can take appropriate action to shut down part or all of the fuel system in the facility to avoid a fuel catastrophe.

Notwithstanding the above it is presently believed that there is a need for an improved safety device for a fuel outlet commonly referred to as a gas station or the like to prevent pumping fuel such as gasoline or other highly volatile fuel into a motor vehicle while the vehicle's engine is running. There should he a demand because the system in accordance with the invention is located in a gas station and not in each auto. Further, the device has three separate sensors to determine if the vehicle adjacent the pump has an engine that is running. There should be a demand for such systems because the systems in accordance with the present invention are believed to be highly reliable, relatively free of maintenance and capable of being manufactured at a competitive cost. The systems in accordance with the present invention also incorporate an automatic warning for alerting a driver to turn off the vehicle's ignition in order to pump fuel.

BRIEF SUMMARY OF THE INVENTION

In essence the present invention contemplates a safety device for a fuel outlet to prevent the delivery of fuel to a motor vehicle when the vehicles engine is running. The safety device comprises or consists of a fuel pump and a sound sensor adjacent said fuel pump and adapted to sense the sound of a running engine in an adjacent vehicle. In addition, a temperature sensor adjacent to the pump detects the engine temperature of an adjacent vehicle and the RF radiation from the spark plugs for detecting a running engine is provided. A data analyzer and a control unit may also he provided for disabling the fuel pump when a running engine is detected in the vicinity of the fuel pump.

The invention will now he described in connection with the following drawings wherein like reference numerals have been used to identify like parts.

DESCRIPTION OF THE PREFERRED EMBODIMENTS OF THE INVENTION

There are a number of risks associated with the delivery of highly combustible fuel such as gasoline to a motor vehicle. Such risks are exacerbated by indifference or carelessness with respect to safe practices. For example, there are individuals who may smoke a cigarette while refilling a motor vehicle and/or leaving a motor running while adding fuel. At times, an individual with a defective starter or weak battery may be tempted to refill the vehicle without turning off the engine. Others in extremely hot weather may want to leave the air conditioner on with the engine running. Further, the increase in self-service fuel stations increase the risk of a catastrophic result.

Figure 1:
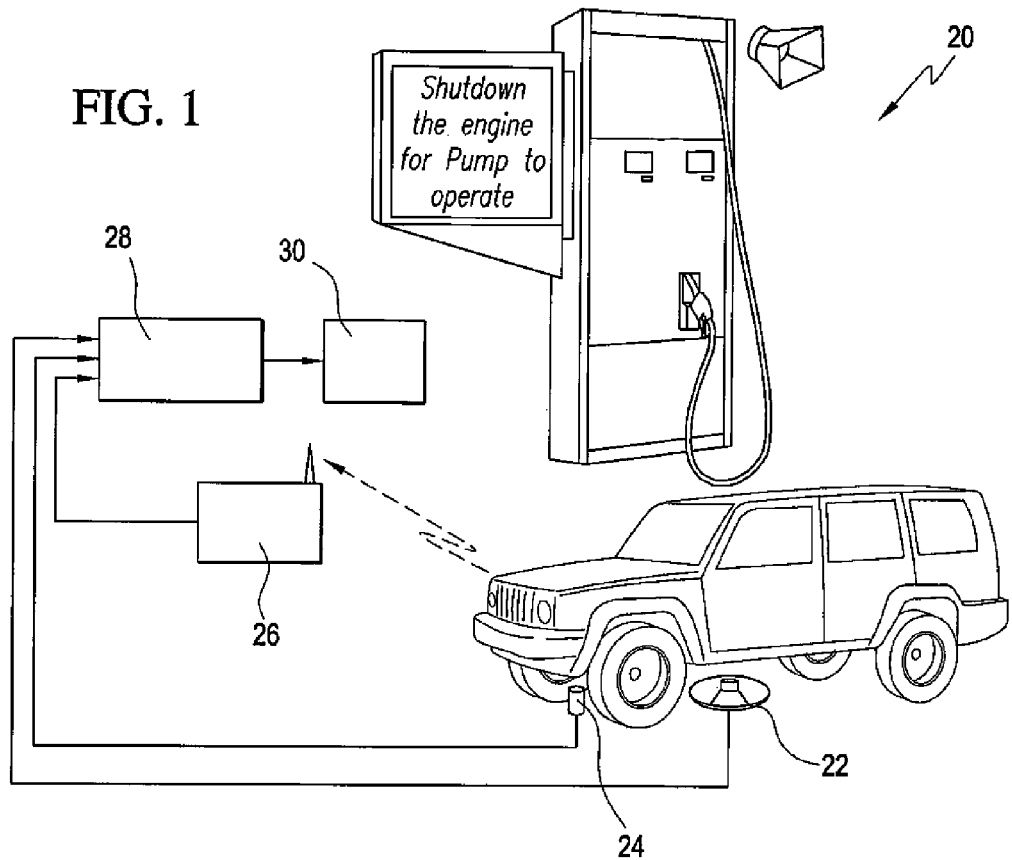
FIG. 1 is a schematic illustration of a safety device or system in accordance with a preferred embodiment of the invention.
Figure 2:
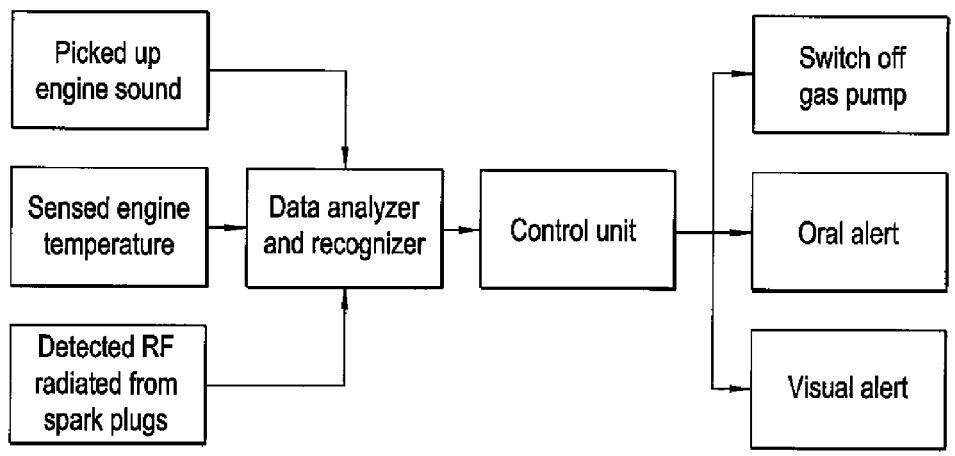
FIG. 2 is a block diagram illustrating the operation of a device or system as shown in FIG. 1.

In an effort to minimize such risks, a safety device has been developed that prevents an individual from filling a vehicle with fuel until the engine is turned off. These devices will be available to fuel or gasoline stations and includes three sensors. The sensors monitor the status of an adjacent vehicle. The safety device includes two in ground sensors in front of a gasoline pump for sensing the sound of a running engine and the temperature of a running engine. The device also includes an RF sensor to pick up an RF signal radiated by the spark plugs. The invention also includes a control system that inhibits the operation of the delivery pump if the vehicle's engine is running and allows normal operation of the delivery pump only if the vehicle's engine is turned off. FIGS. 1 and 2 illustrates the main components of a device and/or system in accordance with a preferred embodiment of the invention.

As illustrated, a device or system 20 includes three sensors, a first sensor 22 for detecting the sound of a running engine is disposed in the ground below a motor vehicle positioned below the vehicles engine. A second sensor 24 for detecting the temperature of the engine is also disposed in the ground and a third sensor 26 for detecting RF radiation is positioned adjacent the pump. The device or system 20 also includes a data analyzer 28 and control unit 30.

The function of the sensors 22, 24 and 26 is to provide an electrical signal to the data analyzer 28 such that the data analyzer 28 senses a vehicle in front of the pump and provides an indication of whether the engine is miming or turned off. The sensors include a sound sensor 22 installed on the ground in front of the fuel dispensing pump. It has a microphone fixed on a specially shaped frame which positions the microphone and provides a highly sensitive microphone to detect the sound coming from the upper direction i.e. coming from the vehicle waiting in front of the fuel pump. The microphone will have less sensitivity to other sounds coming from neighboring areas. A second sensor 24 is also located on the ground in front of the fuel distributor pump and produces an electrical signal proportional to the heat radiated from the vehicle parked over it. A third sensor 26 for detecting the RE radiation from spark plugs is located adjacent the pump.

In a preferred embodiment of the invention, the safety device is constructed and arranged to include a data analyzer and recognizer. The data analyzer and recognizer units receive signals coming from the sound, temperature and RF sensors. It conditions, filters, samples, stores certain time frames and processes these signals to reach a decision that there is a vehicle waiting in front of the fuel dispensing pump and its engine is either shut down or running. If the engine is shut down the data analyzer and recognizer will give a signal to the control unit to allow the fuel pump to operate, otherwise, it gives a signal to the control unit to inhibit the fuel pump to operate.

The sensors monitor common behaviors regarding the state of a vehicle which is to be supplied by fuel. Basically, there are six states, namely:

State 1 no vehicle is front of the fuel pump. In this state the received signals from the sensors are the background noise. The level of the background noise may change from time to time over a day. This is because of the traffic density in the state has maximum and minimum values within a day. Sound and RE background noise will increase with higher traffic. Noise level may also vary from day to day according to weather, i.e. wind may affect the background noise of the sound sensor, similarly ambient temperature will affect the background noise of the temperature sensor as will sun spots and Ionospheric noise may affect the RE detector. Therefore, the data analyzer and recognizer performs a periodic check for background noise levels for each sensor and uses these values in evaluating its final decision that will instruct the control unit to start the fuel pump or to inhibit.

State 2 applies to a vehicle that is approaching the filet pump. This state is characterized by increasing signal levels from the three sensors.

State 3 includes a vehicle waiting in front of the fuel pump with an engine running. Each of the three sensors will give a high signal level with relatively constant average, each signal will be modulated by a periodic signal whose frequency is proportional to the revolutions per minute of a running engine.

State 4 refers to a time when a vehicle is waiting in front of the fuel pump and its engine is shut down. As the engine is shut down, the output signal from sound and RE sensors will drop sharply to a level nearly equal to the background noise while the output signal from the temperature sensor will decrease slowly and its level will considerable higher than the background noise of State 1 which is a good confirmation that there is a car waiting in front of the fuel pump and the sound and RE sensors will be two witnesses that the engine is shut down.

State 5 refers to a vehicle waiting in front of the fuel pump and its engine is started. The sound sensor will produce a high paused signal followed by a steady signal whose level is higher than or equal to the level of State 3. The output of the RE sensor will increase instantly to the level of State 3. The output of the temperature sensor will increase gradually.

State 6 refers to a vehicle that is departing from the area of the fuel pump. This state is characterized by decreasing signal levels provided by each sensor.

The analyzer and recognizer can recognize the above mentioned six states if the analyzer and recognizer recognize that State 4 is a reality, then it instructs the control unit to allow the operation of the fuel pump. Otherwise, the operation of the fuel pump is inhibited.

The control unit adds extra restriction to the regular control system for a fuel dispensing pump. The control unit gets orders from the data analyzer and recognizer to allow or inhibit the operation of the fuel pump. Therefore, the proposed system can be added to existing safety systems with minor modifications to the existing safety systems. The control unit also controls a multi-media equipment to alert and instruct a vehicle operator according the state recognized by the data analyzer and recognizer. This multi-media may include a large LCD screen and loud speaker to alert the vehicle driver or instruct the driver to turn of the engine in order to fuel the vehicle.

While the invention has been described in connection with its preferred embodiments it should be recognized that changes and modifications may he made therein without departing from the scope of the appended claims.

What is claimed is:

1. In combination, a fuel pump, hose and nozzle and a safety device for a fuel outlet to prevent the delivery of highly combustible fuel to a motor vehicle with a running engine located adjacent to the fuel pump, comprising:
   a sound sensor disposed in or on the ground in front of the fuel pump and including a microphone directed upwardly to sense a sound of a running engine;
   a temperature sensor disposed in or on the ground and directed upwardly to sense a temperature of an engine of a motor vehicle parked in front of the fuel pump;
   a RF radiation detector adjacent the fuel pump for sensing radiation from spark plugs of a running engine in front of said pump and wherein the RF detector is a short wave radio tuned to 18 MHz;
   a control unit, a data analyzer and recognizer operatively connected to the control unit, wherein the data analyzer and recognizer are operatively connected to each of the sensors and detectors for aggregating data from each of the sensors/detectors for communicating a signal to the control unit for allowing or inhibiting operation of the fuel pump depending on whether an adjacent engine is running or stopped; and
   an LCD screen and loud speaker for advising a motor vehicle operator to turn off an engine of a motor vehicle in order to refuel the vehicle when the analyzer and recognizer determines a running engine state.

* * * * *